United States Patent [19]

Morse

[11] Patent Number: 4,775,055
[45] Date of Patent: Oct. 4, 1988

[54] SPICE CONTAINER RACK

[76] Inventor: Guy Morse, 516 Palace Dr., Altamonte Springs, Fla. 32714

[21] Appl. No.: 50,192

[22] Filed: May 15, 1987

[51] Int. Cl.$^4$ ............................................. A47F 5/02
[52] U.S. Cl. ........................................ 211/78; 211/77
[58] Field of Search ............... 211/71, 74, 77, 78, 211/70, 69, 70.6

[56] References Cited

U.S. PATENT DOCUMENTS

| 2,052,801 | 9/1936 | Russakov | 211/77 |
| 2,880,882 | 4/1959 | Lipka | 211/77 |
| 2,946,456 | 7/1960 | Liguori | 211/77 |

Primary Examiner—Robert W. Gibson, Jr.
Attorney, Agent, or Firm—William M. Hobby

[57] ABSTRACT

A spice container rack apparatus having a carousel support base with a rotable carousel platform rotably mounted thereto. The rotable carousel platform has a center portion and an annular spice container holding base extending around the center portion. The annular spice container holding base has a plurality of first recessed areas having arcuate edges and a bottom for holding a spice container therein. The annular spice container holding base has a plurality of second recessed areas formed therein with each second recessed area being formed in the bottom of one of said first recessed areas and also has walls on the bottom for supporting a spice container having a different sized bottom therein from the spice container held in said first recessed area. The rotable carousel platform center portion may hold other containers or items therein. The center portion may be raised to extend above the general level of spice containers surrounding the center portion.

6 Claims, 1 Drawing Sheet

SPICE CONTAINER RACK

BACKGROUND OF THE INVENTION

The present invention relates to a lazy susan spice container rack for supporting different sizes or shaped spice containers therein.

In the past, a wide variety of spice container racks have been provided, including spice racks which are attached to kitchen walls for placing spices in a horizontal, as well as a vertical direction. Spice containers are also made for sitting on a flat surface and holding a variety of spices when in view, so that the spices can be readily identified. It has been common in the past to provide various types of lazy susan or rotable container supports, so that when placed on a table, or the like, a spice container or condiment tray can be rotated by any person sitting around the table to identify any particular desired spice or condiment.

Typical prior art lazy susan type container supports can be seen in the following U.S. Patents. U.S. Pat. No. 1,878,302 to Tourtois is for a display stand for holding cylindrically shaped bottles therearound and in the center. This patent has recessed areas in the rotable portion thereof. U.S. Pat. No. 3,311,225 to Kidd shows a package and dispenser assembly having a rotable surface with recessed areas, while U.S. Pat. No. 2,121,711 shows a condiment holder for a plurality of spices, or the like, to be held therein. U.S. Pat. No. 3,198,338 to McCormick shows a bowling ball display rack with a plurality of rotating containers stacked one on top of the other. A rotable rack is illustrated in the McCoppin Patent, U.S. Pat. No. 2,281,849 which has two levels for holding containers in the front and back, each separately rotable. U.S. Pat. No. 367,329 to Witherell shows a caster for holding containers which in a rotable shelf, while U.S. Pat. No. 3,331,515 to Lange shows a condiment holder which is rotable and has a center connected light. The Lipka U.S. Pat. No.: 2,880,882, shows a mechanically rotable food server for holding containers therein and has a center holder for additional food.

The present invention, on the otherhand, is a simplified spice container rack, specifically designed for commercial off-the-shelf spices already placed in decorative containers and is adapted for either one of the spice manufacturers containers to be quickly supported on the rotable display rack. The rack is designed so that it can be easily injection molded for mass production and may have different center configurations for holding additional spices or other materials.

SUMMARY OF THE INVENTION

The present invention relates to a lazy susan type spice container rack which has a carousel support base with a rotable carousel platform rotably mounted to the base. The rotable carousel platform has a center portion which may be a container or which may support other containers therein. An annular spice container holding base extends around the center portion. The annular spice container holding base has a plurality of first recessed areas therein having arcuate walls and a bottom side for holding a spice container therein. The annular spice container holding portion has a plurality of second recessed areas therein. Each second recessed area being recessed in the bottom side of the first recessed area of the annular spice container holding portion and also has walls and a bottom for supporting a spice container having a different bottom shape or size, so that at least two sizes of spice containers can be supported in the recessed area of the spice container holding portion. This allows the two most common spice containers purchased from a grocery store to be rapidly positioned on the rack and replaced as needed. Each second recessed area in the annular spice container holding base has a hexagonal wall shape for receiving specially shaped spice containers therein.

BRIEF DESCRIPTION OF THE DRAWINGS

Other objects, features and advantages of the present invention will be apparent from the written description and the drawings in which.

DESCRIPTION OF THE PREFERRED EMBODIMENTS

Figure 1:
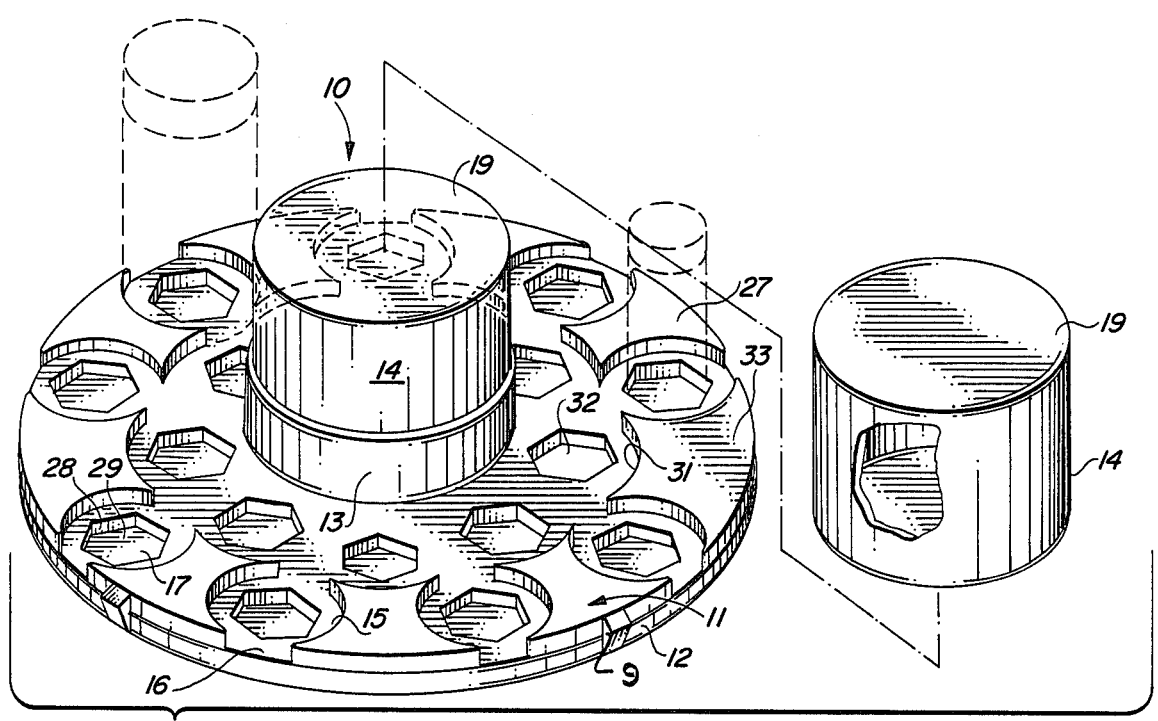
FIG. 1 shows a perspective view of a spice rack container in accordance with the present invention having the center portion exploded therefrom.
Figure 2:
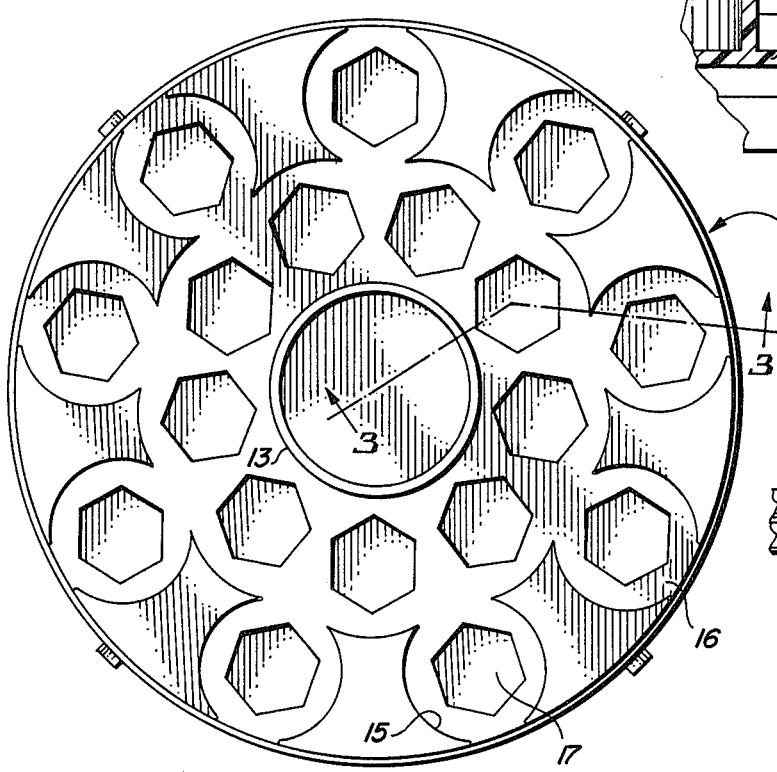
FIG. 2 shows a top elevation of the spice rack container of FIG. 1.

Referring to the drawings, and especially to FIGS. 1 through 2, a spice container rack 10 of the lazy susan type has a rotable spice support portion 11 clipped with clips 9 to and rotably mounted with a rotable base portion 12. The spice container 10 has a center circular wall 13 which may support different shapes in the center thereof, such as the circular container 14 having a flat top 19. The support 11 has the annular center portion 13 with an annular spice container holding base 27 surrounding the center portion 13. The surrounding spice holding base 27 includes a plurality of generally arcuate openings 15, each having at least a pair of arcuate sides, walls and a bottom 16. The recessed area 15 is specifically made to size to fit one of the common spice bottles found in grocery stores, so that the spices may be purchased in decorative bottles and inserted into the recessed area 15 supported in the bottom 16. The bottom 16 has a further recessed area 17 which has either hexagonal or a plurality of angled walls connected together and a bottom 29 for supporting a second type of decorative spice container found in stores.

Thus, each pair of recessed areas 15 and 17 will accept each of the two most common types of decorative spice containers therein, and can be placed anywhere around the outer periphery of the spice holding base 27, or alternatively, can be placed along an inner periphery which forms a plurality of holding areas having one arcuate wall 31 formed on one side and spaced from the circular wall 13 a predetermined distance to support the one size container which would normally fit in the recessed area 15 between the wall 31 and the wall 13. The second recessed areas 32 are similar to recessed areas 29 and has the hexagonal walls and the bottoms therein and are positioned in the center of the arcuate wall 31 along the inner periphery and space between the wall 31 and wall 13. The raised area 33 formed by the recessed areas for three spice containers also spaces two of the outer recessed areas 15 so as to give visibility to the spice containers in the back of the spice rack along the inner periphery.

Figure 3:
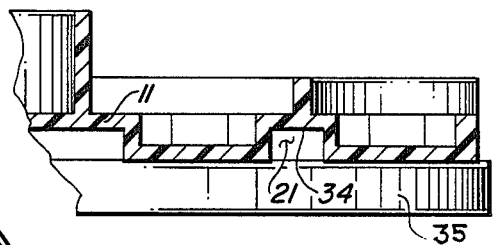
FIG. 3 is a sectional view taken on line 3—3 of FIG. 2.

In FIG. 3, the top platform 11 may be easily injection molded of polymers for fitting on a lazy susan base 35 having an annular bearing 21 placed in an annular groove 34. The annular bearing 21 may be a flat self-lubricating polymer or can be a ball or roller bearing as desired. This embodiment allows the lazy susan unit to be built as one complete unit rather than being attached to an existing rotating base.

Figure 4:
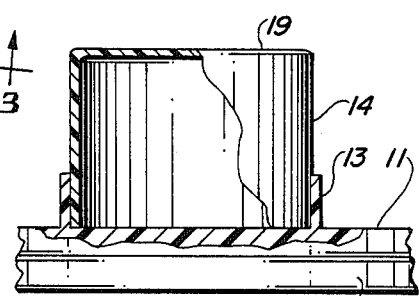
FIG. 4 is a sectional view taken through the center portion of the spice rack of FIGS. 1 and 2.
Figure 5:
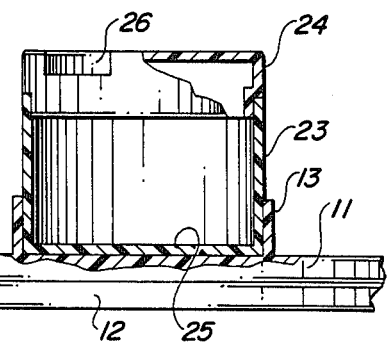
FIG. 5 is a sectional view of an alternate embodiment of a center portion for a spice rack in accordance with FIGS. 1 and 2.

FIG. 4 illustrates a circular center portion with a flat top as shown in FIG. 1 or may be a container for holding different substances therein, as shown in the alternate embodiment of FIG. 5. FIG. 5 has a removable top 24 fitting onto a container 23 having a bottom 25 which is supported by the annular wall 13 of the spice rack holder base 11. The top 24 has a gripping insert 26 so that the top can be easily grasped to remove the top 24. Alternatively, the openings 26 can be utilized to hold additional bottles if desired. With the top 24 removed and nothing placed in the container 23, the open walls can hold one or more larger containers in the center of the lazy susan spice rack.

It should be clear at this point that a lazy susan type spice rack has been provided which has the versatility to utilize existing decorative spice containers which can be quickly inserted or exchanged into the rack and which spice rack can be conveniently and inexpensively manufactured from an injection mold. It should, however, be clear that the present invention is not to be limited to the forms shown which are to be considered illustrative than restrictive.

I claim:

1. A spice container rack comprising:
   a carousel support base;
   a rotable carousel platform rotably mounted to said carousel support base for rotation thereon;
   said rotable carousel platform having a center portion and an annular spice container holding base extending around said center portion;
   said annular spice container holding base having a plurality of first recessed areas therein, each having arcuate walls and a bottom for holding a spice container therein;
   said annular spice container holding base having a plurality of second recessed areas being formed therein, each second recessed area being formed in the bottom of one first recessed area of said annular spice container holding portion and having walls and a bottom for supporting a spice container therein, said annular spice container holding base having an outer circle of first and second recessed areas and an inner circle of first and second recessed areas, said inner circle of first and second recessed areas having first recessed areas with spaced arcuate walls curved in the same directions for holding a spice container therebetween whereby at least two sizes of spice containers can be supported in the recessed areas of a spice container holding base and rotated with said rotable carousel platform on said carousel support base.

2. A spice container rack in accordance with claim 1 in which said annular spice container holding base second recessed areas have hexagonal walls and a flat bottom.

3. A spice container rack in accordance with claim 1 in which said rotable carousel platform center portion has an annular wall with a center container therein.

4. A spice container rack in accordance with claim 3 in which said rotable carousel platform center portion container has a covering lid.

5. A spice container rack in accordance with claim 4 in which said rotable carousel platform center portion container lid has a recessed area formed therein.

6. A spice container rack in accordance with claim 1 in which said rotable carousel platform center portion has a raised cylindrical portion having a smooth top.

* * * * *